(12) United States Patent
Gasparini et al.

(10) Patent No.: US 8,132,011 B2
(45) Date of Patent: Mar. 6, 2012

(54) SYSTEM AND METHOD FOR AUTHENTICATING AT LEAST A PORTION OF AN E-MAIL MESSAGE

(75) Inventors: Louis A Gasparini, San Mateo, CA (US); William H Harris, Woodside, CA (US)

(73) Assignee: EMC Corporation, Hopkinton, MA (US)

( * ) Notice: Subject to any disclaimer, the term of this patent is extended or adjusted under 35 U.S.C. 154(b) by 1415 days.

(21) Appl. No.: 11/112,059

(22) Filed: Apr. 22, 2005

(65) Prior Publication Data

US 2005/0268101 A1 Dec. 1, 2005

Related U.S. Application Data

(63) Continuation-in-part of application No. 11/050,549, filed on Feb. 3, 2005, now Pat. No. 7,730,321, and a continuation-in-part of application No. 10/435,322, filed on May 9, 2003, now Pat. No. 7,100,049.

(60) Provisional application No. 60/564,879, filed on Apr. 23, 2004.

(51) Int. Cl.
*H04L 9/32* (2006.01)

(52) U.S. Cl. ........ 713/170; 713/176; 713/178; 709/237; 705/75; 380/246; 380/255; 726/4

(58) Field of Classification Search .................. 713/176, 713/170, 178; 709/237; 705/75; 726/4; 380/246, 255

See application file for complete search history.

(56) References Cited

U.S. PATENT DOCUMENTS

| | | | |
|---|---|---|---|
| 6,067,561 A | 5/2000 | Dillon | |
| 7,039,949 B2* | 5/2006 | Cartmell et al. | 726/6 |
| 7,379,550 B2* | 5/2008 | Merzenich | 380/282 |
| 2002/0052921 A1* | 5/2002 | Morkel | 709/206 |
| 2002/0188689 A1* | 12/2002 | Michael | 709/206 |
| 2003/0055903 A1* | 3/2003 | Freed | 709/206 |
| 2003/0122922 A1* | 7/2003 | Saffer et al. | 348/14.01 |
| 2003/0135740 A1* | 7/2003 | Talmor et al. | 713/186 |
| 2003/0154371 A1* | 8/2003 | Filipi-Martin et al. | 713/153 |
| 2003/0217107 A1* | 11/2003 | Parry | 709/206 |
| 2004/0054741 A1* | 3/2004 | Weatherby et al. | 709/206 |
| 2004/0059786 A1* | 3/2004 | Caughey | 709/206 |
| 2004/0096064 A1* | 5/2004 | Merzenich | 380/282 |
| 2004/0117451 A1* | 6/2004 | Chung | 709/207 |
| 2004/0177120 A1* | 9/2004 | Kirsch | 709/206 |
| 2004/0205248 A1* | 10/2004 | Little et al. | 709/246 |
| 2004/0205451 A1* | 10/2004 | Kowalski | 715/500 |
| 2005/0060643 A1* | 3/2005 | Glass et al. | 715/501.1 |
| 2005/0125667 A1* | 6/2005 | Sullivan et al. | 713/170 |

FOREIGN PATENT DOCUMENTS

WO PCT/US05/13878 4/2007

* cited by examiner

*Primary Examiner* — April Shan

(74) *Attorney, Agent, or Firm* — Ryan, Mason & Lewis, LLP

(57) ABSTRACT

A system and method allows some or all of an e-mail message, such as the sender or its contents, to be authenticated, for example, to identify a message as potential spam.

20 Claims, 4 Drawing Sheets

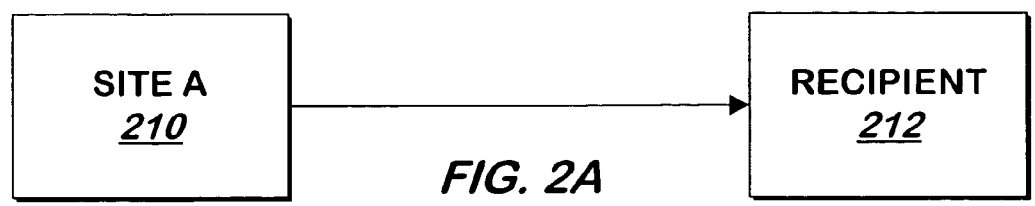
FIG. 2A
FIG. 2B
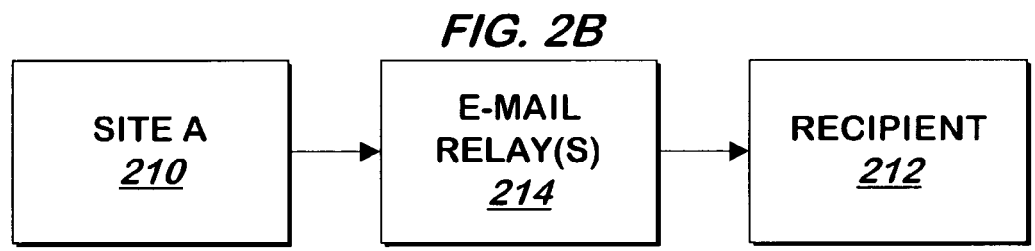

SYSTEM AND METHOD FOR AUTHENTICATING AT LEAST A PORTION OF AN E-MAIL MESSAGE

RELATED APPLICATIONS

This application claims the benefit of U.S. Provisional Application Ser. No. 60/564,879, entitled Method and Apparatus for Authenticating at Least a Portion of an E-Mail Message" filed by William Harris and Louis Gasparini on Apr. 23, 2004, and is a continuation in part of application Ser. No. 11/050,549 entitled, "System and Method for Authentication of Users and Communications Received from Computer Systems" filed on Feb. 3, 2005 now U.S. Pat. No. 7,730,321 by Louis Gasparini and William Harris, and application Ser. No. 10/435,322 entitled, "Method and Apparatus for Authentication of Users and Web Sites" filed on May 9, 2003 now U.S. Pat. No. 7,100,049 by Louis Gasparini and Charles Gotlieb, each having the same assignee as this application and all are incorporated herein by reference in their entirety.

FIELD OF THE INVENTION

The present invention is related to computer software and more specifically to computer software for authenticating e-mail messages.

BACKGROUND OF THE INVENTION

Persons can send e-mail messages to other users, yet the recipient has no way of knowing that the sender or the message is authentic. What is needed is a system and method for authenticating an e-mail message.

SUMMARY OF INVENTION

A system and method places customization information (referred to herein as "passmark information") into a field of an e-mail header. The passmark can be used to verify the authenticity of the sender, the message, or both.

BRIEF DESCRIPTION OF THE DRAWINGS

FIG. 2A is a block schematic diagram of an e-mail network according to one embodiment of the present invention.

FIG. 2B is a block schematic diagram of an e-mail network according to one embodiment of the present invention.

DETAILED DESCRIPTION OF A PREFERRED EMBODIMENT

Figure 1:
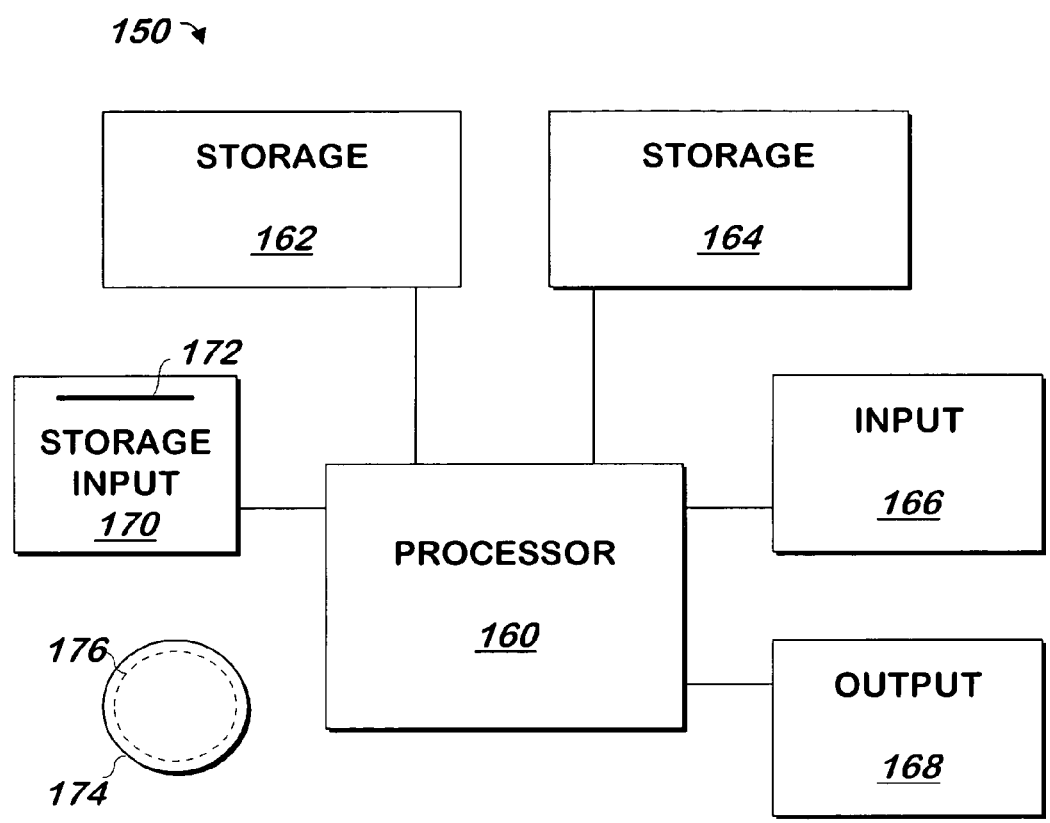
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS ULTRA 10 workstation running the SOLARIS operating system commercially available from SUN MICROSYSTEMS, Inc. of Mountain View, Calif., a PENTIUM-compatible personal computer system such as are available from DELL COMPUTER CORPORATION of Round Rock, Tex. running a version of the WINDOWS operating system (such as 95, 98, Me, XP, NT or 2000) commercially available from MICROSOFT Corporation of Redmond Wash. or a Macintosh computer system running the MACOS or OPENSTEP operating system commercially available from APPLE COMPUTER CORPORATION of Cupertino, Cali. and the NETSCAPE browser commercially available from NETSCAPE COMMUNICATIONS CORPORATION of Mountain View, Calif. or INTERNET EXPLORER browser commercially available from MICROSOFT above, although other systems may be used.

Referring now to FIG. 2A, an entity at site A 210 sending email to another entity (individual) at recipient 212, can identify themselves as being prior known to the recipient using PassMark information as described the related application.

According to the present invention, PassMark information, referred to as customization information here and in the related applications, consisting of information known to the recipient and some or all senders of messages to the recipient, but not generally associated with the recipient by the general public, such as the PassMark text phrase or other PassMark data, could be included in an email X-Header by the sender, or email relay of the sender.

An X-Header allows for senders to include data that can be read by client or gateway programs to perform actions based upon the content of the X-Header fields.

For example, a sender at site A 210 could include my PassMark text phrase in an X-PassMark field included in the email header. It might looks something like this (if "My Daughter Elena" is my PassMark text phrase):

X-PassMark:My Daughter Elena

Client mail reader software at recipient 212 could inspect the X-PassMark field of the message header and perform rules based upon this. The rule would look to see if the value of X-PassMark field matches a value (or one of a set of values) configured by the user for the client reader. If the value matched, then the message would be treated as authentic/nonspam and allowed through, or placed in a specific folder, or other action to convey the validity of the message.

Referring now to FIG. 2B, in addition to the use of the present invention as described above, agreements could be setup with network carriers (ISPs) that would allow special handling for X-PassMark enabled messages, such as not treating them as potential spam. This identification of authentic senders by ISPs could be validated by cryptographic signatures using time bounded conditions or other available mechanisms to avoid replay attacks of scammer looking to pretend to be a valid X-PassMark sender to an ISP. (Note, the X-PassMark field for ISPs in this case is used separate and different than the above description for end user email client reader usage).

A sender at site A 210 can include a time bounded signature, or other cryptographic technique to convey to ISPs & email relays that the sender is authentic and avoid scam replays of the signed field. This could be included in an X-PassMark-Provider field.

The ISP/email relay 214 would identify the message as not being spam, and allow it through based on the field, and could reject it otherwise or mark it as potential spam.

The recipient email reader 212 may also be able to verify this field and reject it or send it to a potential spam inbox if the field did not contain the proper passmark information.

Figure 3:
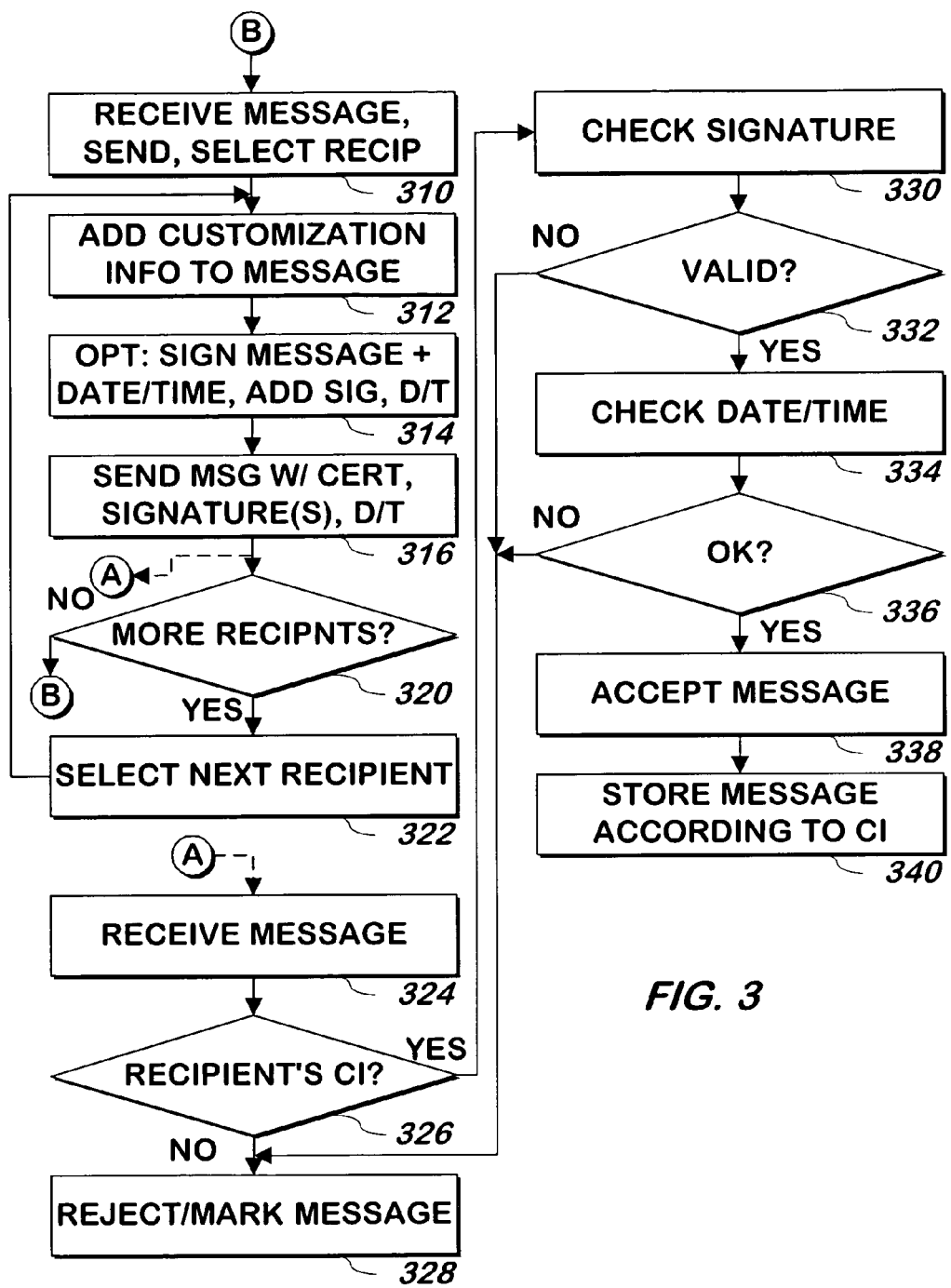
FIG. 3 is a flowchart illustrating a method of sending, authenticating, forwarding, receiving and storing one or more e-mail messages according to one embodiment of the present invention.

Referring now to FIG. 3, a method of sending, authenticating, forwarding, receiving and storing one or more e-mail messages is shown according to one embodiment of the present invention. An e-mail message is received from the sender, the message is sent to any recipients for which customization information of the recipient is not known by the sender, and a recipient for which customization information is known by the sender is selected 310. The selected recipient's customization information, described in the related applications, is added 312 to the message as described above. The selected recipient's customization information may have been previously received from the recipient and stored, associated with the e-mail address of the recipient, and this process may be repeated for a number of other potential recipients of e-mail messages. In one embodiment, step 312 is performed automatically, by retrieving from the location in which it was stored, the customization information for any recipient of the message for which customization information is stored.

The customization information may be signed using conventional hash or cryptography techniques. The current date and time may be obtained and signed in a similar or identical manner, either together with the signature of the customization information or separately 314. The message with the customization information, date and time, one or more signatures, and optional certificate is then sent 316 to the selected recipient using conventional techniques. The customization information and date and time may be added to the header, and the one or more signatures and certificate may be added to the header or included as an attachment to the e-mail message using conventional techniques. If there are additional recipients for the message 320, the next recipient for which customization information is known by the sender is selected 322 and the method continues at step 312 using the selected recipient.

The message is received 324, either by the recipient or by a relay for the recipient. If the message does not contain the customization information of the recipient 326, the message is rejected or accepted but marked as having a questionable origin 328, and otherwise, the method continues at step 330. Step 328 may include forwarding the message to the recipient or a server used by the recipient and may include storing the message in a folder of messages of questionable origin.

At step 330, the signature of the customization information or combined customization information and date and time is checked to ensure that the signature is valid, for example, using the sender's public key, which may be made available via the certificate attached to the message. In one embodiment, step 330 includes validating the certificate using conventional techniques. If the signature is not valid 332, the method continues at step 322 and otherwise 332, the current date and time is retrieved and compared with the date and time included in the message. A difference is computed between the two dates and times, and if the difference does not exceed a threshold 334, the date and time is considered to be OK. If the date and time is OK 336, the message is accepted 338. Step 338 may include forwarding the message from a relay to the recipient or a server used by the recipient. The message may be stored in a manner according to the customization information in the message. A recipient can have different customization information that allow a message to be accepted, but the message is stored in different folders corresponding to the customization information received with the message.

It is noted that the encrypted date and time technique helps to prevent against replay attacks, where the encrypted customization information is simply copied from one message to another. However, other methods of preventing replay attacks may be used in place of the encrypted date and time, or this portion of the invention may be omitted altogether.

Figure 4:
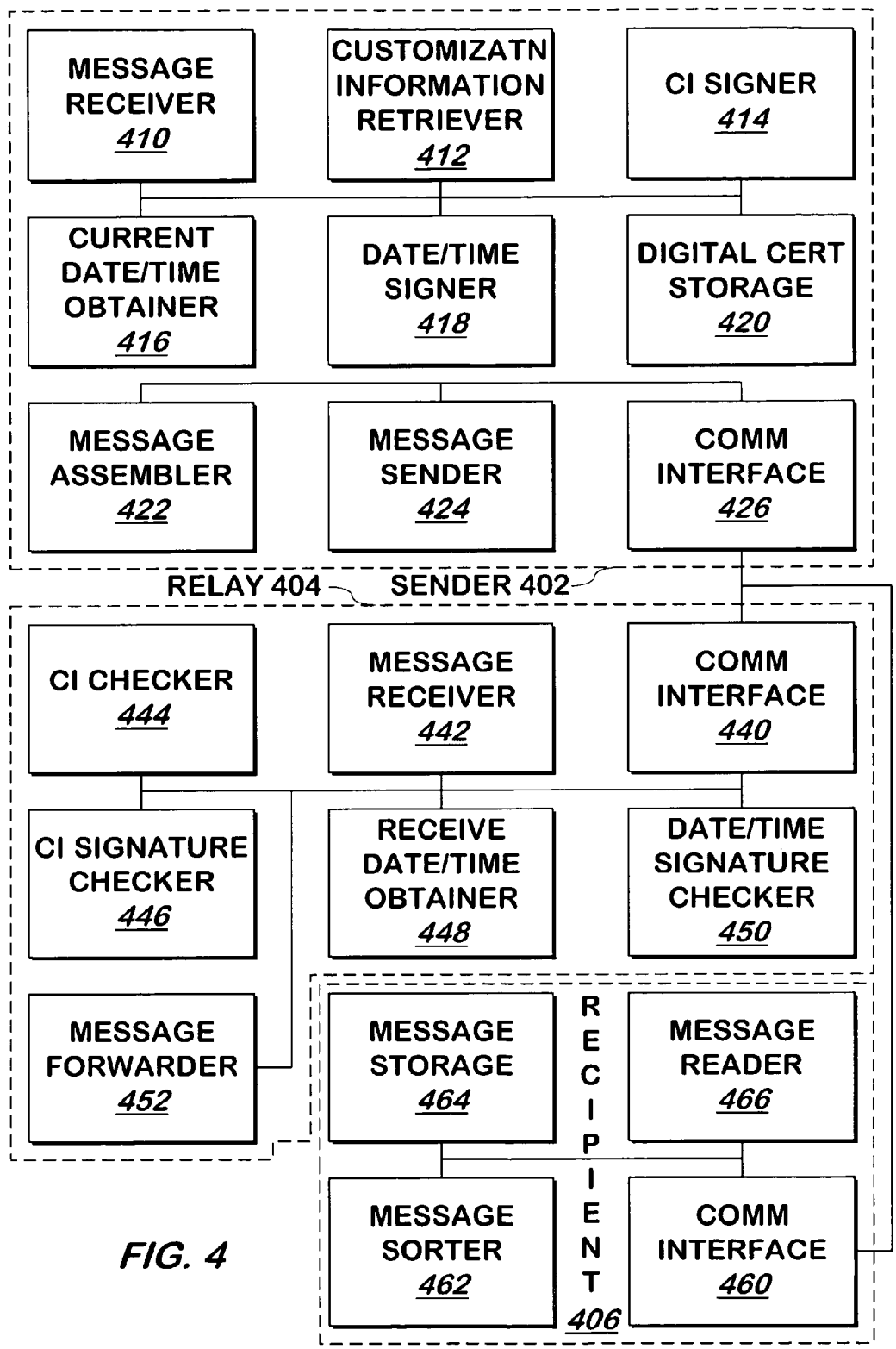
FIG. 4 is a block schematic diagram of a system for sending, authenticating, forwarding, receiving and storing one or more e-mail messages according to one embodiment of the present invention.

Referring now to FIG. 4, a system for sending, authenticating, forwarding and storing e-mail messages is shown according to one embodiment of the present invention.

In one embodiment, three components are used: a message sender 402 may include a conventional e-mail client. Relay 404 may include a conventional ISP or other mail relay. Recipient 406 may include a conventional mail client. The functions of the relay 404 may be included in the recipient mail client 406 instead of arranging it as a separate device, or it may be part of a mail server (not shown).

Message receiver 410 receives a conventional e-mail message, and if the message has more than one recipient, it is processed by message receiver 410 one recipient at a time. Message receiver 410 provides the recipient's e-mail addresses to customization information retriever 412, which retrieves any customization information previously stored by the sender for the current recipient via an input (not shown) to customization information retriever 412 via a user interface it generates. Customization information retriever 412 provides any such customization information it locates to message receiver 410. If no such information is available for the recipient of the message being processed, message receiver 410 provides the message for that recipient and the recipient e-mail address to message sender 424, which sends the message to the recipient as a conventional e-mail message via communication interface 426. If the customization information for the recipient being processed is provided by customization information retriever 412, message receiver 410 provides the customization information to customization information signer 414, which signs the customization information, such as by encrypting it using the private key of a public/private key pair of the sender and returns the signed customization information to message receiver 410. Message receiver 410 signals current date/time obtainer, which obtains and returns to message receiver 410 the current date and time, for example, using the system clock. Message receiver 410 passes the date and time to date/time signer, which produces and returns to message receiver 410 a signature of the date and time using the same signing technique as was used by customization information signer 414.

Message receiver 410 provides the message, the customization information, the signed customization information, the date and time and the signed date and time to message assembler, 422, which assembles such information into an e-mail message as described above and provides the e-mail message to message sender 424, which sends the message to the recipient using conventional techniques via communication interface 426. Communication interface 426 is a conventional communication interface that supports TCP/IP, Ethernet and other conventional protocols. Communication interface 426 and message sender 424 send the message to relay 404.

Communication interface 440 of relay 404 receives the message and forwards it to message receiver 442. Message receiver 442 removes from the message any customization information, date and time, signatures and certificate, and if no customization information was provided, message receiver 442 either discards the message or marks the message as having a questionable origin and provides it to message forwarder 452 for forwarding to the recipient. Otherwise, message receiver 442 sends the e-mail address of the recipient for whom the message was received to customization information checker 444.

When it receives the customization information, customization information checker 444 looks up the e-mail address to determine whether the customization information for the message matches any customization information previously provided by the recipient corresponding to the e-mail address. (Various users for whom relay 404 receives messages may have previously entered one or more sets of customization information, such as a phrase, to customization information checker 444 via communication interface 440 and a user interface provided by customization information checker 444.) Customization information checker 444 indicates to message receiver 442 whether the customization information provided matches that stored for the e-mail address. If not, message receiver 442 either discards the message or marks it as having a questionable origin and provides it to message forwarder 452 for forwarding as described below.

If the indication indicates that the customization information matches the recipient, message receiver 442 provides the customization information and its signature and the certificate to customization information signature checker 446, which checks the certificate and the signature as described above and indicates to message receiver 442 whether the signature is valid and matches the customization information. If not, message receiver 442 discards the message or marks it as having a questionable origin and provides it to message forwarder 452, for forwarding as described below. If so, message receiver 442 signals receive date/time obtainer 448, which retrieves and provides to message receiver 442 the current date and time, for example, using the system clock. Message receiver provides the current date and time, and the date and time from the message, its signature and the certificate to date/time signature checker 450.

When it receives the above items, date/time signature checker 450 checks the signature against the date and time received with the message using the certificate it receives and checks the date and time against the current date and time. Date/time signature checker 450 indicates to message receiver 442 whether the signature does not match the date and time or the difference between the date and time exceeds a threshold. If so, message receiver 442 either discards the message or marks it as having a questionable origin, and provides it to message forwarder 452 for forwarding as described below. Otherwise, message receiver 442 provides the message and customization information to message forwarder 452, which forwards these things to recipient system 406 via communication interface 440 and communication interface 460, both of which are conventional communication interfaces similar or identical to communication interface 426 described above. In the event that message forwarder 452 receives the message with an indication that it has questionable origin, message forwarder similarly forwards the message and the indication to recipient system 406.

Communication interface 460 forwards the messages, and the customization information or indication to message sorter 462, which stores the message into one of various folders in message storage 464 according to whether the indication was received or customization information was received. In one embodiment, message storage 464 includes conventional memory or disk storage arranged into file folders in the manner of a conventional e-mail system. If customization information was received, and a user may receive messages with different customization information, the user can specify to message sorter 462 the folder into which a message having a specific customization information should be stored. Messages with customization information of one phrase may be stored into one folder, and messages with customization information of a different phrase may be stored into a different folder, each by message sorter 462. Messages having an indication that the message has a questionable origin may be stored into a different folder by message sorter 462. In one embodiment, a user may specify to message sorter 462 the folder to use for each customization information (and for the indication that the message has a questionable origin) via communication interface 460 and a user interface provided by message sorter 462. The user can retrieve, view, rearrange and delete messages from the folders using message reader 466, which operates to perform these activities in the manner of a conventional e-mail client.

What is claimed is:

1. A method of providing an outgoing e-mail message, comprising the steps of:

responsive to a sender identifying a recipient to whom the outgoing e-mail message is to be sent, the sender retrieving customization information corresponding to the recipient, the customization information having been previously received by the sender from the recipient, the customization information being known to the recipient and the sender, but not otherwise associated with the recipient by general public;

the sender signing the retrieved customization information with information corresponding to the sender; and the sender sending the retrieved customization information and the signed customization information to the recipient in the outgoing e-mail message, the recipient thereby receiving the customization information previously received by the sender from the recipient and signed by the sender;

wherein the steps are performed at least in part by at least one processor coupled to at least one memory.

2. A method of receiving an e-mail message, comprising the steps of:

a recipient receiving from a sender the e-mail message;

the recipient processing the e-mail message responsive to:
   a content and existence of customization information corresponding to the recipient; and
   a signature made by the sender responsive to the customization information with information corresponding to the sender;

the customization information and the signature having been sent by the sender to the recipient in the e-mail message responsive to the sender identifying the recipient of the e-mail message, the customization information having been previously provided by the recipient to the sender, the recipient thereby receiving in the e-mail message the customization information previously received by the sender from the recipient and signed by the sender, the customization information being known to the recipient and the sender, but not otherwise associated with the recipient by general public;

wherein the steps are performed at least in part by at least one processor coupled to at least one memory.

3. The method of claim 1, wherein the customization information is selected by the recipient.

4. The method of claim 1, wherein the customization information comprises a text phrase.

5. The method of claim 1, further comprising:
signing timestamp information with information corresponding to the sender of the e-mail message; and
sending the signed timestamp information with the e-mail message.

6. The method of claim 1, further comprising:
receiving the e-mail message prior to the sending step.

7. The method of claim 2, wherein the customization information is selected by the recipient.

8. The method of claim 2, wherein the customization information comprises a text phrase.

9. The method of claim 2, wherein the e-mail message set is processed further responsive to timestamp information included with the e-mail message.

10. The method of claim 9, further comprising:
computing a difference between the timestamp information included with the e-mail message and a current time;
accepting the e-mail message only if the computed difference is below a threshold value.

11. The method of claim 2, further comprising:
accepting the e-mail message if the customization information included in the e-mail message matches at least a portion of a given set of customization information; and
classifying the e-mail message based at least in part on which portion of the given set of customization information is matched by the customization information included in the e-mail message.

12. An apparatus for providing an outgoing e-mail message, the apparatus comprising:
a memory; and
a processor coupled to the memory, the processor being operative to:
responsive to identifying a recipient to whom the outgoing e-mail message is to be sent, retrieve customization information corresponding to the recipient, the customization information having been previously received from the recipient;
sign the retrieved customization information with information corresponding to a sender of the e-mail message; and
send the retrieved customization information and the signed customization information in the outgoing e-mail message from the sender to the recipient, the recipient thereby receiving in the e-mail message the customization information previously received by the sender from the recipient and signed by the sender, the customization information being known to the recipient and the sender, but not otherwise associated with the recipient by general public.

13. The apparatus of claim 12, wherein the customization information is supplied to the sender by the recipient.

14. The apparatus of claim 12, wherein the customization information comprises a text phrase selected by the recipient.

15. The apparatus of claim 12, wherein the processor is further operative to:
sign timestamp information with information corresponding to the sender of the e-mail message; and
send the signed timestamp information with the e-mail message.

16. The apparatus of claim 12, wherein the processor is further operative to:
receive the e-mail message from a given apparatus prior to the sending operation.

17. The apparatus of claim 16, wherein the given apparatus is associated with the sender.

18. The method of claim 1, wherein the step of the sender sending the retrieved customization information and the signed customization information to the recipient in the outgoing e-mail message comprises the sender sending the retrieved customization information and the signed customization information to the recipient in at least one X-Header of the outgoing e-mail message.

19. The method of claim 2, wherein the customization information and the signature were sent by the sender to the recipient in at least one X-Header of the e-mail message responsive to the sender identifying the recipient of the e-mail message.

20. The apparatus of claim 12, wherein the processor is operative to send the retrieved customization information and the signed customization information in at least one X-Header of the outgoing e-mail message from the sender to the recipient.

* * * * *